Figure 1:
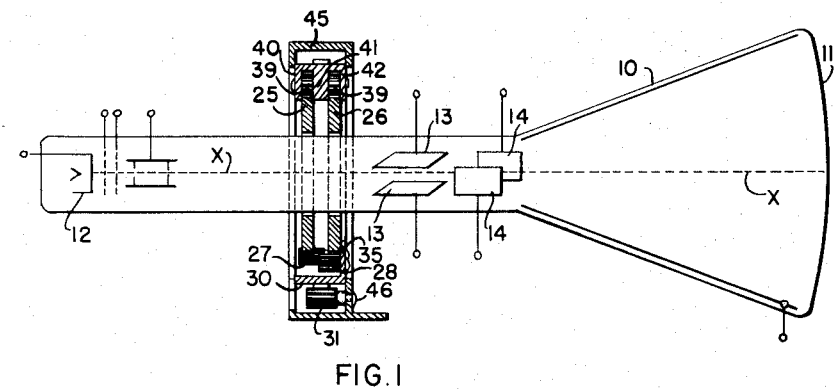

Oct. 17, 1950     A. V. LOUGHREN     2,525,919

CENTERING ARRANGEMENT FOR CATHODE-RAY TUBES

Filed July 1, 1948

*INVENTOR.*
ARTHUR V. LOUGHREN

BY John A. Harvey

ATTORNEY

Patented Oct. 17, 1950

2,525,919

UNITED STATES PATENT OFFICE 2,525,919

CENTERING ARRANGEMENT FOR CATHODE-RAY TUBES

Arthur V. Loughren, Great Neck, N. Y., assignor to Hazeltine Research, Inc., Chicago, Ill., a corporation of Illinois Application July 1, 1948, Serial No. 36,315

8 Claims. (Cl. 250—161)

The present invention is directed to cathode-ray-tube centering arrangements which enable the undeflected or neutral position of the electron beam to be so adjusted that the beam is incident on any desired point of the target or screen area of the tube. In most cathode-ray-tube applications, it is preferred that the undeflected beam strike the center of the target area and for that reason arrangements which determine the neutral position of the beam are referred to as "centering arrangements." However, the one to be described may accomplish accurate centering of the beam or it may establish any other neutral position that may be required.

Numerous beam-centering arrangements have heretofore been proposed in the art, especially for television installations where it is necessary to be able to adjust the picture relative to the screen area. Frequently, the cathode-ray tube of a television receiver has magnetic deflecting windings to which suitable signals are applied so to control the beam as to scan the screen in a rectilinear pattern in reproducing a received image. Centering in electromagnetically deflected tubes has been accomplished heretofore by supplying polarizing direct currents of suitable intensities and polarities to the horizontal and vertical deflecting windings. While satisfactory centering may be thus obtained, the current drain which it adds to the system may be objectionable. Moreover, centering with the aid of polarized currents may not be as convenient as that provided by this invention.

In an effort to avoid the need for centering currents in the deflecting windings, it has been proposed that the centering arrangement make use of a permanent magnet usually in the form of a ring supported coaxially with and externally of the cylindrical neck of the cathode-ray tube. The permanent magnet establishes a deflecting field across the path of the electron beam. A magnetic shunting device, for example a ring or sleeve of soft iron, is associated with the magnet and is adjustable along the neck of the tube to govern the intensity of that field. Additionally, the magnet is rotatably supported so that the direction of its field may be controlled. Having adjustments for both the intensity and direction of the field, this arrangement may accomplish selective displacement of the beam and establish a desired relation of the undeflected beam relative to the screen area. Arrangements of this type frequently are undesirable because of the space requirements needed to accommodate the displacement of the magnetic shunt along the neck of the tube. This is especially true for tubes constructed with a short neck and electromagnetically scanned since the deflecting yoke is necessarily also positioned about the neck of the tube and has an appreciable length with relation to the length of the tube neck. Further, the use of a magnetic shunt may not permit as wide a range of variation in the correcting field as may be necessary in certain cathode-ray-tube applications.

It is an object of the present invention, therefore, to provide an electron-beam centering arrangement for a cathode-ray tube which avoids one or more of the aforementioned limitations of prior centering arrangements.

It is another object of the invention to provide an improved centering arrangement for a cathode-ray tube which is mechanically simple and compact.

It is a further object of the invention to provide a centering arrangement for a cathode-ray tube having minimized space requirements and featuring the use of a correcting field established by permanent magnets and controllable in direction and intensity throughout a wide range of variations.

In accordance with the invention, an electron-beam centering arrangement is provided for a cathode-ray tube having a target area and an electrode system for generating and directing an electron beam along a given path to the target area. The centering arrangement comprises a plurality of permanent magnets having magnetic fields so related as to develop a variable effective field intensity between zero and a predetermined maximum, being positioned individually to establish a magnetic beam-deflecting field transversely of the path and supported for rotation relative to one another and for rotation about the path of the electron beam to establish an effective beam-deflecting field having an intensity and direction determined by the relative angular orientations of the magnets about the path of the beam.

For a better understanding of the present invention, together with other and further objects thereof, reference is had to the following description taken in connection with the accompanying drawing, and its scope will be pointed out in the appended claims.

Figure 2:
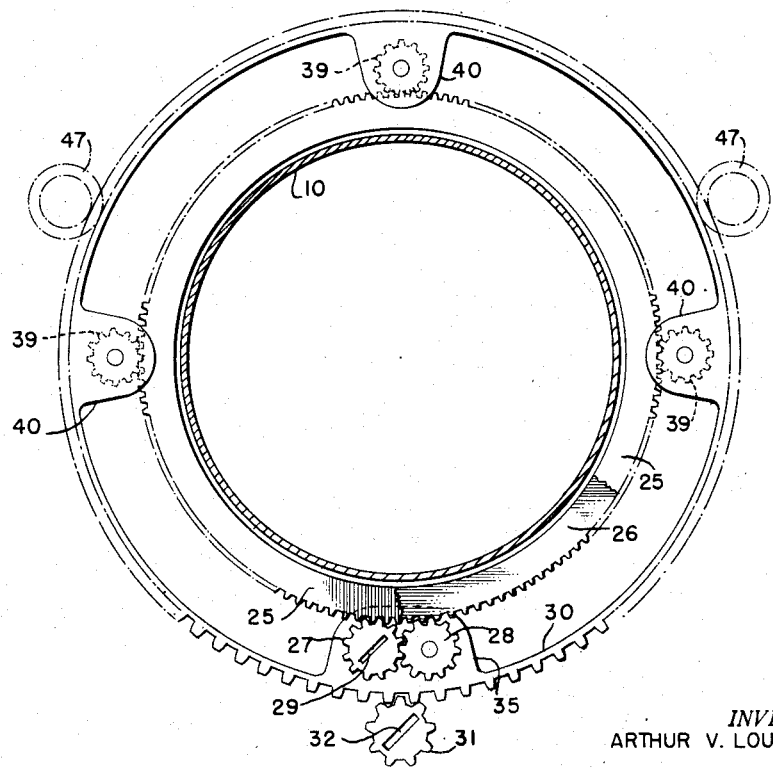

In the drawing, Fig. 1 is a schematic representation of a cathode-ray tube with which is associated an electron-beam centering arrangement in accordance with the invention; and Fig. 2 is a detail view showing a portion of the mechanical structure of the centering arrangement.

Referring now more particularly to Fig. 1, the cathode-ray tube assembly there represented includes a beam-centering arrangement constructed in accordance with the present invention. Since the tube structure, per se, constitutes no part of the invention, it has been represented schematically, and while the tube may have deflecting elements of the electromagnetic or the electrostatic type, the latter have been represented for convenience. Structurally, the tube comprises the usual glass envelope 10 having a target area 11 at its enlarged end. From the target area, the tube is tapered to form an elongated neck portion which is generally cylindrical in cross section and which houses the cathode 12 of the conventional electrode system for generating and directing an electron beam along a given path to the target area. The dash-dot construction line X—X represents the undeflected or neutral path of the electron beam from the cathode 12 to the target area 11. In order to simplify the representation, the circuits ordinarily associated with the electrode system and with the electrostatic deflecting plates 13,13 and 14,14 have been omitted from the drawing. They may, of course, be of conventional design and arrangement.

Where the geometry of the several components of the cathode-ray tube is ideal, the undeflected position of the beam is one in which the beam strikes the center of the screen 11 but it is found in practice that some imperfections may arise in production which cause the neutral-beam position to be off center. For that reason, a centering arrangement is conventionally provided to correct the neutral or undeflected position of the beam. The present invention relates particularly to such centering arrangement.

The centering device comprises a plurality of permanent magnets positioned individually to establish an essentially uniform magnetic beam-deflecting field transversely of the path of the electron beam, the magnets being supported for rotation relative to one another and for angular rotation about the path of the beam to provide an effective beam-deflecting field havin an intensity and direction determined by the relative angular orientations of the magnets about the path of the beam. The magnets have magnetic fields so related as to develop a variable effective field intensity between zero and a predetermined maximum. More specifically, the centering device represented schematically in Fig. 1 comprises a pair of ring-type permanent magnets 25 and 26. These magnets may be closed magnetic rings or each may include two semicircular or C-shaped permanent magnets arranged with like poles facing one another essentially to define a ring-type permanent magnet structure. It will be assumed throughout the remainder of this description that each of the magnets 25 and 26 is a closed magnetized ring constructed of a magnetic material exhibiting high coercive force. Each magnet may, for example, be formed of "Alnico."

The plane of each of the magnets 25 and 26, and the median plane of the flux thereof, is normal to the axis of the neck portion of the tube 10. Usually, the magnets are positioned externally of the tube in coaxial relation with the neck portion. This arrangement of ring-type magnets enables the inner periphery of each magnet to conform closely to the cross-sectional configuration of the neck of the tube and facilitates establishing a uniform flux density across the path of the electron beam. It will be appreciated, however, that the magnets need not necessarily have a ring shape to provide such field of uniform flux density. In any event, the permanent magnets must have such an internal dimension as to permit their rotation about the neck portion of the tube.

The centering arrangement also includes means for producing relative rotation of the magnets 25 and 26 to determine the intensity of the effective beam-deflecting field which they conjointly establish across the path of the electron beam. To that end, in the embodiment under consideration each of the magnets 25 and 26 has teeth on its external periphery to be engaged by a driving system for simultaneously rotating these magnets in opposite directions about the path of the electron beam. The driving system, as shown more clearly in Fig. 2, comprises a pinion gear 27 in meshing engagement with the external teeth of the ring magnet 25 and a pinion gear 28 engaging the teeth of the ring magnet 26. The pinion gears 27 and 28 in turn engage one another so that rotation of one (such as the gear 27) effects rotation of both of the magnets. Actuation of the driving system may be accomplished by a slot 29 milled in the side face of the gear 27 to accommodate a screw driver.

The magnets 25 and 26, as well as the pinion gears 27 and 28, are enclosed within and supported by a nonmagnetic housing or ring 30 which is rotatable about the neck of the tube 10. The ring 30 constitutes means for simultaneously rotating the magnets 25 and 26 about the path of the electron beam, while preserving their relative angular relationship, to determine the direction of the effective beam-deflecting field established across the path by those magnets. The ring 30 carries on its outer periphery gear teeth which are engaged by a driver pinion gear 31. The latter has a screwdriver slot 32 to facilitate rotation of the supporting ring 30.

To complete the centering arrangement as a structural mechanism, the pinion gears 27 and 28 may be rotatably supported upon stub shafts affixed to a flange 35 extending from the inner periphery of the ring 30. Other flange assemblies projecting from the inner periphery of the ring 30 support idler pinion gears 39,39 which engage the gear teeth of the magnets 25 and 26, serving to support and center those magnets relative to the axis of the centering structure. The last-mentioned flange assemblies may have three leaf sections 40, 41 and 42 as shown in Fig. 1 extending on opposite sides of the magnets 25 and 26 to prevent lateral displacement thereof when an adjustment is being made. A supporting frame 45 may enclose the described centering structure and support a shaft 46 upon which the pinion gear 31 is rotatably supported. Idler gears 47, 47 may also be supported internally of the frame 45 to assist in supporting and centering the ring 30. Flanges of the structure 45 may extend on opposite sides of the ring 30 to prevent any lateral displacement of the beam-centering structure. The frame 45 may be anchored to the chassis of the apparatus into which the cathode-ray tube is incorporated. The mechanical portions of the centering arrangement, with the exception of the magnets 25 and 26, are preferably constructed of a nonmagnetic material such as brass and the flange portions of the members 30 and 45 may be removable to facilitate assembling.

In considering the operation of the beam-centering arrangement, it will be appreciated that each of the magnets 25 and 26 establishes an essentially uniform magnetic field in median planes normal to the axis of the neck portion of the tube and, therefore, transverse to the path of the electron beam. The magnitude of the field established by each magnet may be represented by a vector, and the vectorial sum of the fields is a determination of the magnitude of the effective field resulting from the individual magnets 25 and 26. It is, of course, well understood that a magnetic field extending across the path of an electron beam is effective to deflect the beam in a direction perpendicular to the lines of flux and to an extent which is related to the field intensity.

If it is assumed that the tube structure is ideal and thus that the neutral position of the beam in the absence of the centering arrangement is at the center of the screen 11, no correcting effect or centering is necessary for the usual application. In such a case, the pinion gear 27 may be rotated to drive the permanent magnets 25 and 26 in opposite directions until the north pole of one magnet is diametrically opposed to the north pole of the other. Then if the magnets are matched, that is, generally similar in strength, their fields oppose one another and provide a net correcting field of zero intensity. On the other hand, assume that the uncorrected neutral position of the electron beam of the tube is seriously off center and it is desired to have the neutral position precisely at center. The gear drive 27, 28 is then adjusted to rotate the magnets 25 and 26 relative to one another to bring their fields toward aiding relation, the magnets being rotated until the correct intensity of the centering field is obtained. When the correct intensity has been achieved, it is necessary to have the direction of the correcting field adjusted so that the beam is brought to the center position of the screen 11. The direction of the effective correcting or centering field may be varied by simultaneously rotating the magnets 25 and 26 while maintaining their relative angular positions fixed. This is accomplished through the driver gear 31 which rotates the ring 30 until the effective centering field is in the appropriate direction.

By way of summation, the pinion gears 27 and 28 permit the ring magnets 25 and 26 to be rotated about the path of the electron beam and relative to one another. This relative rotation of the magnets enables the intensity of the centering field to have any desired value within a wide range. At one limit of this range, the centering field is zero (when the fields of the magnets oppose one another) and at the other limit the centering field has twice the strength of either magnet taken alone (when the fields of the magnets fully aid one another). The driver gear 31 enables the ring 30 to be rotated so that the centering field conjointly established by the magnets 25 and 26 may have any angular position within a range of 360 degrees. The two adjustments (intensity and direction) afford the necessary degrees of freedom for establishing the centered position of the electron beam at the central point or wherever desired on the target 11 of the cathode-ray tube 10.

The described arrangement has the advantage that it does not increase the power drain of the cathode-ray-tube installation and has the further advantage that it occupies only a very limited region of the neck portion of the tube. Moreover, the centering field is subject to a wide range of variations as regards intensity and direction so that the centered position of the beam may be controlled over a wide area of the screen 11.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electron-beam centering arrangement for a cathode-ray tube, having a target area and an electrode system for generating and directing an electron beam along a given path to said area, comprising: a plurality of permanent magnets having magnetic fields so related as to develop a variable effective field intensity between zero and a predetermined maximum, being positioned individually to establish a magnetic beam-deflecting field transversely of said path and supported for rotation relative to one another and for angular rotation about said path to provide said effective beam-deflecting field having an intensity and direction determined by the relative angular orientations of said magnets about said path.

2. An electron-beam centering arrangement for a cathode-ray tube, having a target area and an electrode system for generating and directing an electron beam along a given path to said area, comprising: a plurality of permanent magnets having magnetic fields so related as to develop a variable effective field intensity between zero and a predetermined maximum, being positioned externally of said tube for individually establishing a magnetic beam-deflecting field transversely of said path and supported for rotation relative to one another and for angular rotation about said path to provide said effective beam-deflecting field having an intensity and direction determined by the relative angular orientations of said magnets about said path.

3. An electron-beam centering arrangement for a cathode-ray tube, having a target area and an electrode system for generating and directing an electron beam along a given path to said area, comprising: a plurality of permanent magnets having magnetic fields so related as to develop a variable effective field intensity between zero and a predetermined maximum, being positioned coaxially of said path and externally of said tube for individually establishing a magnetic beam-deflecting field transversely of said path and supported for rotation relative to one another and for angular rotation about said path to provide said effective beam-deflecting field having an intensity and direction determined by the relative angular orientations of said magnets about said path.

4. An electron-beam centering arrangement for a cathode-ray tube, having a target area and an electrode system for generating and directing an electron beam along a given path to said area, comprising: a plurality of ring-type permanent magnets having magnetic fields so related as to develop a variable effective field intensity between zero and a predetermined maximum, being positioned coaxially of said path for individually establishing a magnetic beam-deflecting field transversely of said path and supported for rotation relative to one another and for angular rotation about said path to provide said effective beam-deflecting field having an intensity and direction determined by the relative angular orientations of said magnets about said path.

5. An electron-beam centering arrangement for a cathode-ray tube, having a target area and an electrode system for generating and directing an electron beam along a given path to said area, comprising: a plurality of permanent magnets having magnetic fields so related as to develop a variable effective field intensity between zero and a predetermined maximum, being positioned individually to establish a magnetic beam-deflecting field transversely of said path and supported for rotation relative to one another and for angular rotation about said path; means for producing relative rotation of said magnets to determine said intensity of said effective beam-deflecting field established by said magnets across said path; and means for rotating said magnets together about said path while preserving their relative angular relation to determine the direction of said effective beam-deflecting field.

6. An electron-beam centering arrangement for a cathode-ray tube, having a target area and an electrode system for generating and directing an electron beam along a given path to said area, comprising: a pair of permanent magnets having magnetic fields so related as to develop a variable effective field intensity between zero and a predetermined maximum, being positioned externally of said tube for individually establishing a magnetic beam-deflecting field transversely of said path and supported for rotation relative to one another and for angular rotation about said path; a driving system for simultaneously rotating said magnets in opposite directions about said path to determine said intensity of said effective beam-deflecting field established by said magnets across said path; and means for rotating said magnets together about said path while preserving their relative angular relation to determine the direction of said effective beam-deflecting field.

7. An electron-beam centering arrangement for a cathode-ray tube, having a target area and an electrode system for generating and directing an electron beam along a given path to said area, comprising: a plurality of permanent magnets having magnetic fields so related as to develop a variable effective field intensity between zero and a predetermined maximum, being positioned coaxially of said path and externally of said tube for individually establishing a magnetic beam-deflecting field transversely of said path and supported for rotation relative to one another to provide said effective beam-deflecting field having an intensity determined by the angular relation of said magnets with respect to one another; and a nonmagnetic supporting housing for said magnets rotatable about said path to rotate said magnets together and determine the direction of said effective beam-deflecting field.

8. An electron-beam centering arrangement for a cathode-ray tube, having a target area and an electrode system for generating and directing an electron beam along a given path to said area, comprising: a pair of ring-type permanent magnets having magnetic fields so related as to develop a variable effective field intensity between zero and a predetermined maximum, being positioned coaxially of said path and externally of said tube for individually establishing a magnetic beam-deflecting field transversely of said path and supported for rotation relative to one another and for angular rotation about said path; a driving system for simultaneously rotating said magnets in opposite directions about said path to determine said intensity of said effective beam-deflecting field established by said magnets across said path; and a nonmagnetic supporting housing enclosing said magnets and said driving system and rotatable about said path to determine the direction of said effective beam-deflecting field.

ARTHUR V. LOUGHREN.

REFERENCES CITED

The following references are of record in the file of this patent:

UNITED STATES PATENTS

| Number | Name | Date |
|---|---|---|
| 2,102,421 | Kuehni | Dec. 14, 1937 |
| 2,200,039 | Nicoll | May 7, 1940 |
| 2,369,796 | Ramberg | Feb. 20, 1945 |
| 2,416,687 | Fry | Mar. 4, 1947 |
| 2,418,487 | Sproul | Apr. 8, 1947 |
| 2,456,474 | Wainwright | Dec. 14, 1948 |